(12) United States Patent
Nielsen et al.

(10) Patent No.: US 7,468,215 B2
(45) Date of Patent: Dec. 23, 2008

(54) SELF-STARTING FUEL CELL ASSEMBLY

(75) Inventors: Peter Nielsen, Fredericia (DK); Ulrik Karlsson, Fredericia (DK)

(73) Assignee: American Power Conversion Corporation, West Kingston, RI (US)

( * ) Notice: Subject to any disclaimer, the term of this patent is extended or adjusted under 35 U.S.C. 154(b) by 404 days.

(21) Appl. No.: 10/884,678

(22) Filed: Jul. 2, 2004

(65) Prior Publication Data

US 2006/0003197 A1    Jan. 5, 2006

(51) Int. Cl.
*H01M 8/04* (2006.01)
(52) U.S. Cl. .......................... 429/23; 429/13; 429/17; 429/19; 429/22
(58) Field of Classification Search .................. None
See application file for complete search history.

(56) References Cited

U.S. PATENT DOCUMENTS

| | | | | |
|---|---|---|---|---|
| 4,249,236 A * | 2/1981 | Omae et al. | .................... | 363/87 |
| 6,007,930 A * | 12/1999 | Adams et al. | .................. | 429/13 |
| 6,312,843 B1 * | 11/2001 | Kimbara et al. | ................ | 429/25 |
| 6,551,731 B1 * | 4/2003 | Berg et al. | ..................... | 429/13 |
| 6,612,385 B1 * | 9/2003 | Stuhler et al. | ............... | 180/65.3 |
| 6,646,418 B1 * | 11/2003 | Xie et al. | ..................... | 320/120 |
| 2002/0076582 A1 | 6/2002 | Reiser et al. | | |
| 2003/0156960 A1 * | 8/2003 | Wang | .......................... | 417/528 |
| 2004/0062962 A1 * | 4/2004 | Ozeki | .......................... | 429/22 |
| 2005/0186454 A1 * | 8/2005 | Clingerman et al. | .......... | 429/13 |

FOREIGN PATENT DOCUMENTS

EP    1375239    1/2004

* cited by examiner

*Primary Examiner*—Jonathan Crepeau
*Assistant Examiner*—Tony Chuo
(74) *Attorney, Agent, or Firm*—Lowrie, Lando & Anastasi, LLP

(57) ABSTRACT

A self-starting fuel cell assembly and methods of starting fuel cells are disclosed. In at least certain examples, the fuel cell assembly can be configured to supply voltage to a fuel source, an air source or both. The fuel cell assembly further includes a control system configured to detect an output voltage of the fuel cell stack. The control system can be further configured to control at least one of the air source and the fuel source to control the output voltage in a working stage and in a start-up stage.

27 Claims, 15 Drawing Sheets

SELF-STARTING FUEL CELL ASSEMBLY

FIELD OF THE TECHNOLOGY

Certain examples relate to a self-starting fuel cell assembly and methods of starting fuel cells. More particularly, certain examples relate to methods of starting fuel cells using a starting device.

BACKGROUND

Fuel cells are devices that convert a fuel source into a voltage through an electrochemical reaction. The produced voltage is typically used to power one or more devices or can be used for back-up power in the event of power failure. An existing drawback that hinders the use of fuel cells for back-up power operations is that starting a fuel cell requires a voltage to drive the pumps that supply air and fuel to the fuel cell. During a power failure, there may be no such voltage available to start the fuel cell.

U.S. Pat. No. 6,007,930 describes a fuel cell power system that uses a compressor to supply gas to a fuel cell. A significant drawback of this method, however, is that power is required to drive the compressor. In addition, the system becomes more costly and more complex because valves and a compressor are used. There is a need for simpler, cost-effective fuel cell assemblies that are self-starting.

SUMMARY

It is an object of certain examples to provide a self-starting fuel cell assembly and a start method for fuel cells that can use existing fuel cell components. In particular, certain examples discussed below are directed to a self-starting fuel cell assembly that can use a positive feedback loop to control the fuel cell assembly.

In accordance with a first aspect, a fuel cell assembly is provided. In at least certain examples, the fuel cell assembly includes a fuel cell stack, a fuel source, an air source and a control system. While the exact configuration may vary depending on the type of fuel cell stack, in certain examples the fuel source and the air source are in fluid communication with the fuel cell stack and in electrical communication with the control system and the fuel cell stack. The fuel source typically varies depending on the type of fuel cell used and the air source may be any oxidant gas or mixtures of gases including an oxidant gas. In certain examples, the control system is configured to detect an output voltage of the fuel cell stack and configured to control at least one of the air source and the fuel source to control the output voltage in a working stage and in a start-up stage. In the working stage the at least one of the air source and the fuel source is controlled based on the output voltage detected, and in the start-up stage, the at least one of the air source and the fuel source is controlled independent of the voltage detected. In certain other examples, the fuel cell assembly can be configured such that in a start-up stage, a positive feedback loop can be used to control the fuel source or the air source or both. The fuel cell assembly can be further configured such that in a working stage, a negative feedback loop can be used to control the fuel source or air source or both. Exemplary configurations for implementing the start-up stage and the working stage are discussed below, and additional configurations will be recognized by the person of ordinary skill in the art, given the benefit of this disclosure. In certain other examples, the fuel cell assembly may further include a starting device that can provide an initial stimulus to force air or fuel into the fuel cell stack such that voltage can be generated by the fuel cell stack. Exemplary starting devices are discussed below and other suitable starting devices will be selected by the person of ordinary skill in the art, given the benefit of this disclosure.

In accordance with another aspect, a fuel cell assembly is disclosed. The fuel cell assembly includes a fuel cell stack, a load converter in electrical communication with the fuel cell stack, an air source, a fuel source, an air source pump, and a fuel source pump. The air source and air source pump collectively are referred to as an air source system. Similarly, the fuel source and fuel source pump collectively are referred to as a fuel source system. In certain examples, the air source system and the fuel source system are in fluid communication and electrical communication with the fuel cell stack. In some examples, the fuel cell assembly can be configured such that a positive feedback loop can be used to control the fuel source system and/or the air source system at least for a sufficient period during the start-up stage of fuel cell assembly. The fuel cell assembly can be further configured with a starting device to provide an initial stimulus such that the fuel cell can generate an initial voltage for powering the fuel source system or the air source system or both. After a suitable period or after the voltage reaches a pre-defined or threshold voltage, the fuel cell assembly is configured to use a negative feedback loop to control the fuel source system and the air source system during a working stage. Suitable configurations for implementing the positive and negative feedback loops will be selected by the person of ordinary skill in the art, given the benefit of this disclosure, and exemplary configurations implement switches, relays, microprocessors, control circuits, timing circuits, etc. Exemplary starting devices include but are not limited to kick-starters, mechanical levers, pull starters, tubes for blowing air or fuel into the fuel cell stack, etc. and other suitable starting devices will be selected by the person of ordinary skill in the art, given the benefit of this disclosure.

In accordance with an additional aspect, a fuel cell assembly is provided. The fuel cell assembly includes a fuel cell stack comprising a plurality of fuel cells, a starting device configured to provide an initial stimulus to the fuel cell stack for generating a voltage, and a device configured to feed voltage directly to at least one of an air source and a fuel source in a start-up stage and configured to feed voltage to a control system in a working stage. By feeding voltage directly to at least one of the air source and the fuel source in the start-up stage, the air source and/or the fuel source run independent of the control system.

In accordance with a method aspect, a method of starting a fuel cell is provided. In certain examples, the fuel cell assembly includes a fuel cell stack, an air source in fluid communication with the fuel cell stack, a fuel source in fluid communication with the fuel cell stack, and a starting device configured to supply an initial amount of air to a fuel cell stack. The method comprises providing an initial amount of air to the fuel cell stack to generate a voltage, feeding the generated voltage to at least one of the air source and the fuel source until the generated voltage reaches a threshold voltage, converting the generated voltage into a control voltage after the generated voltage has reached the threshold voltage and feeding the control voltage to at least one of the air source and the fuel source.

It will be recognized by the person of ordinary skill in the art, given the benefit of this disclosure, that the fuel cell assemblies and methods of starting the fuel cell assemblies provide a significant technological and industrial advance. Fuel cell assemblies that are self-starting can be designed and used to provide primary power, back-up power, etc. These and other illustrative aspects, embodiments, and examples are discussed in more detail below.

BRIEF DESCRIPTION OF THE DRAWINGS

Certain illustrative examples are described below with reference to the accompanying drawings in which.

Figure 1:
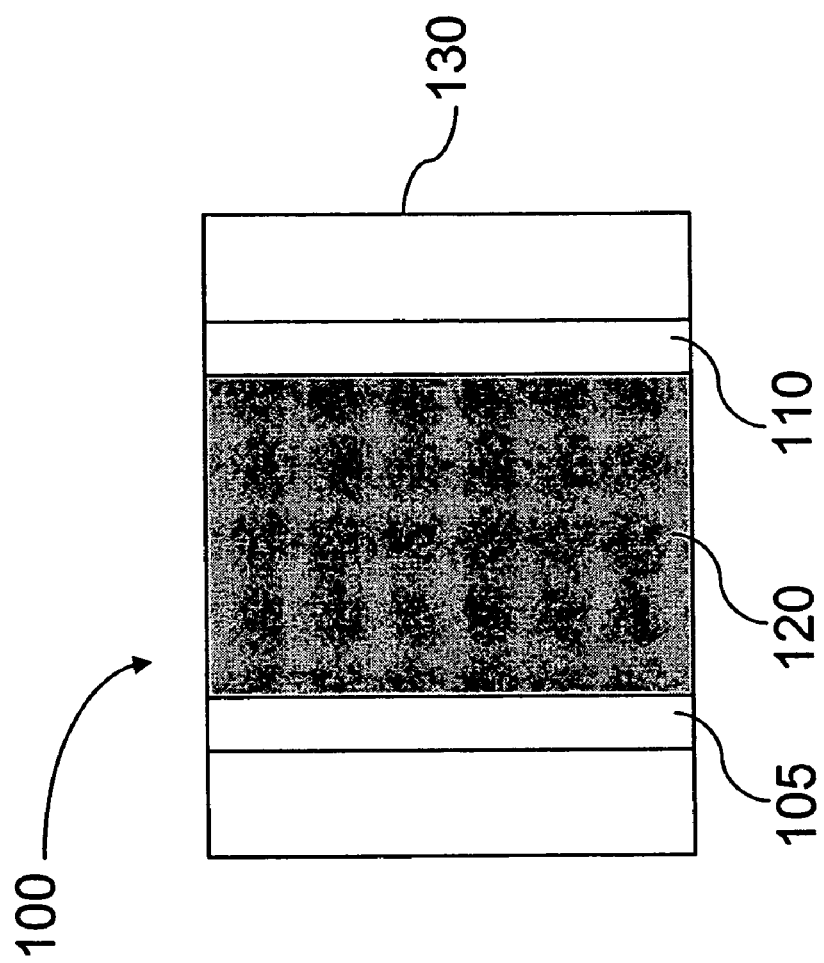
FIG. 1 is an example of a fuel cell, in accordance with certain examples.

Certain features or components of the illustrative fuel cell assemblies shown in the figures may have been enlarged or distorted relative to other features or components to facilitate a better understanding of the novel devices and methods disclosed here. It will be recognized by the person of ordinary skill in the art, given the benefit of this disclosure, that the fuel cell assemblies disclosed here, and methods of their use, can provide power for primary power generation, back-up power generation, portable power generation and other situations where it may be necessary or desirable to implement a self-starting fuel cell assembly.

DETAILED DESCRIPTION OF CERTAIN EXAMPLES

The fuel cell assemblies disclosed herein, and methods of starting the fuel cell assemblies disclosed herein, provide significant advantages over existing fuel cell assemblies including, for example, the self-starting ability of the fuel cell assemblies, a simpler design that allows lower manufacturing costs, a design that facilitates ease of use and higher reliability, a design that lends itself to miniaturization or to construction of large scale fuel cell assemblies with a plurality of fuel cell stacks, etc. It is a significant benefit that the fuel cell assemblies disclosed here have innumerable uses including, but not limited to, primary power generation, back-up power generation, co-power generation, e.g. use of the fuel cell assemblies with one or more additional electric, hydro-electric, gasoline, or nuclear powered motors or turbines for generation of power. These and other illustrative advantages and uses are discussed in more detail below and other advantages and uses will be readily recognized by the person of ordinary skill in the art, given the benefit of this disclosure.

In accordance with certain examples, the fuel cell assemblies disclosed here are configured for operation in a start-up stage and in a working stage. The term "start-up stage," as used in some instances herein, refers to the period or interval where the fuel cell assembly is brought from a state of producing substantially zero voltage to a state where the fuel cell assembly produces some pre-defined or threshold voltage. The term "working stage" refers to the period or interval where the fuel cell assembly produces voltage at or above the pre-defined or threshold voltage such that the voltage can be used to power one or more devices. Certain examples of fuel cell assemblies include a control system that is configured to detect an output voltage of the fuel cell stack. The control system is further configured to control at least one of the air source and the fuel source to control the output voltage in the working stage and in the start-up stage. In the working stage, at least one of the air source and the fuel source is controlled based on the output voltage detected by the control system. In the start-up stage, at least one of the air source and the fuel source is controlled independent of the voltage detected by the control system. As discussed in more detail below, in at least certain examples, a negative feedback loop is used in the working stage, whereas a positive feedback loop is used during the start-up stage.

In accordance with certain examples, it may be necessary to provide an initial stimulus to initiate the start-up stage of the fuel cell assembly. The initial stimulus may be any method or device that can cause a suitable amount of air and/or fuel to be pumped to the fuel cell stack for generation of a voltage. For example, in certain applications, the air source or the fuel source includes a tube that can be blown into by an operator to force air into the fuel cell stack. Without wishing to be bound by any particular scientific theory, as an operator or user blows into the tube, the operator's exhalation into the tube forces air and/or fuel in the fluid lines into the fuel cell stack. This air and/or fuel can be used as reactants in an electrochemical reaction to produce products and a voltage. In other examples, the air source or the fuel source or both include a mechanical chain or rope that can be used to actuate the pump motors, which in turn can force air out of the air source and/or fuel source into the fuel cell stack. In yet other examples, a mechanical lever is connected to the air source pump and/or the fuel source pump such that an operator can manually actuate the pump to supply air and/or fuel to the fuel cell stack. In additional examples, the air source pump and/or the fuel source pump can include a kick-starter to provide a sufficient amount of force to drive the pump to provide a suitable amount of air and/or fuel to the fuel cell stack. The starting device may take numerous other forms. For example, in certain applications, the fuel cell stack itself may contain a manually operated pump to draw air and/or fuel into the fuel cell stack. In yet other examples, a small battery can be connected to the pump or pumps to provide enough power to turn the pumps for at least a few cycles until the fuel cell stack can generate sufficient voltage to power the pumps. Other suitable devices and methods for supplying initial amounts of air and/or fuel to the fuel cell stack will be selected by the person of ordinary skill in the art, given the benefit of this disclosure.

In accordance with certain examples and referring to FIG. 1, fuel cell 100 includes anode 105, cathode 110, electrolyte 120 between anode 105 and cathode 110, and fuel cell housing 130 that houses anode 105, cathode 110 and electrolyte 120. In a typical configuration, fuel is supplied to anode 105 and air or oxygen is supplied to cathode 110. The exact composition of the anode and cathode can vary depending on the nature of the fuel cell, the type of chemical reaction that is to be catalyzed, cost considerations, etc., but in certain examples the anode and the cathode are each made from platinum, palladium, gold, copper, nickel or other conductive metals or metal alloys. In some applications, the anode and cathode can be mixed conductive electrodes that include one or more electrolytes admixed or impregnated in the electrodes. It will be within the ability of the person of ordinary skill in the art, given the benefit of this disclosure, to select suitable materials for the anode and cathode.

In accordance with some examples, the nature of electrolyte 120 typically depends on the type of fuel cell and the type of fuel to be used. For example, phosphoric acid fuel cells (PAFCs) contain phosphoric acid as an electrolyte and can use hydrogen as a fuel source. Proton exchange membrane fuel cells (PEMFCs) include a polymer membrane that can pass protons or conduct protons from one side of the membrane to the other side and can use hydrogen as a fuel source. Molten carbonate fuel cells (MCFCs) contain one or more carbonates, e.g., a liquid solution of lithium, sodium and/or potassium carbonates, as an electrolyte and can use hydrogen as a fuel source. Alkaline fuel cells (AFCs) include a solution of alkaline potassium hydroxide soaked in a matrix as an electrolyte and can use hydrogen as a fuel source. Direct methanol fuel cells (DMFCs) include a polymer membrane similar to those used in PEMFCs and use an aqueous methanol solution as a fuel source. Zinc-air fuel cells (ZAFCs) use an electrolyte that is capable of passing hydroxyl ions. Proton ceramic fuel cells (PCFCs) use a ceramic electrolyte material as an electrolyte and can use hydrocarbons or other hydrogen containing species as fuel. The self-starting fuel cell assemblies disclosed here may be used in any of these or other types of fuel cells, and the person of ordinary skill in the art, given the benefit of this disclosure, will be able to readily use, or adapt for use, the methods and devices provided herein for self-starting of fuel cells in these and other types of fuel cells. The hydrogen that is used as a fuel source may be hydrogen gas that has been purified or can be hydrogen gas that has been reformed using one or more suitable reformers and a suitable hydrogen fuel source such as methane, ethane, propane, coal, etc.

Figure 2:
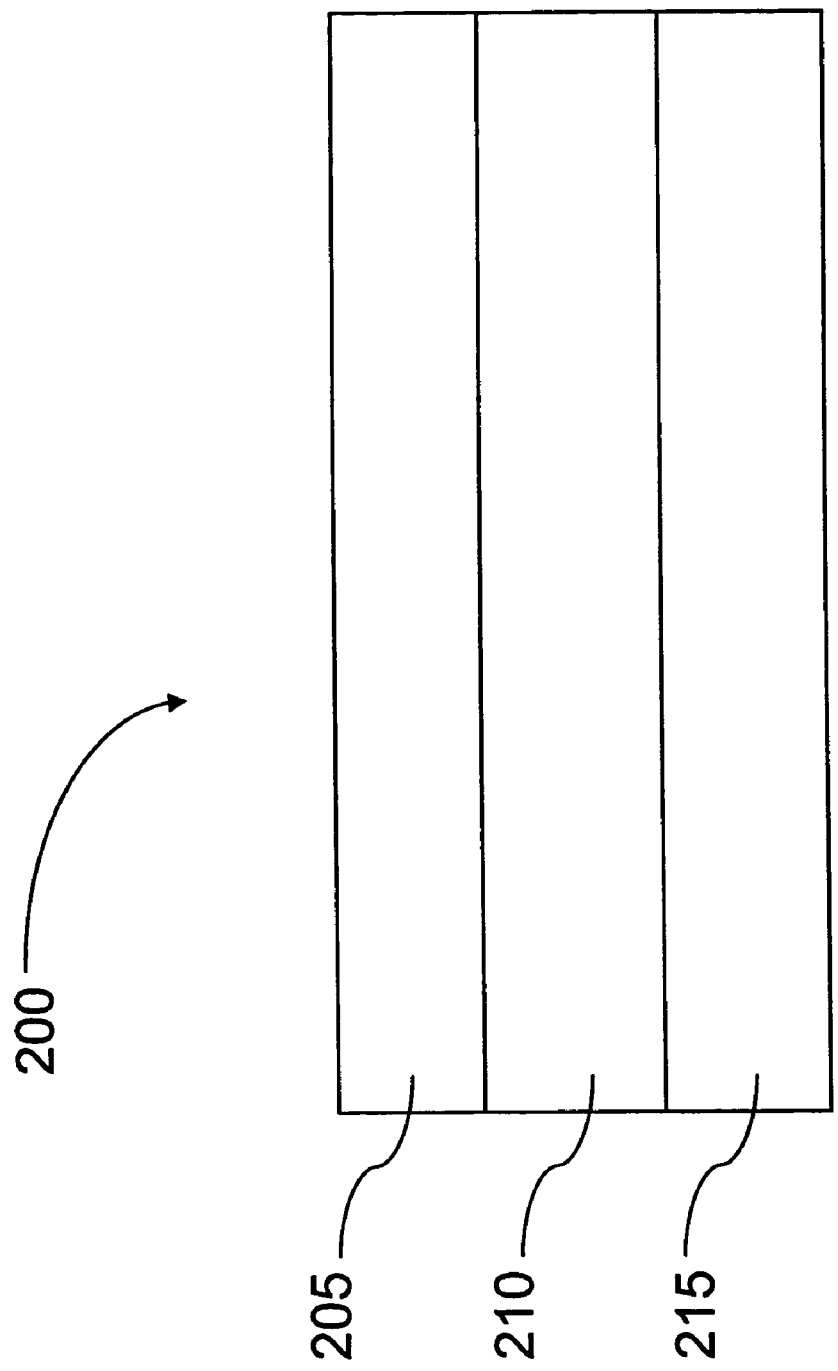
FIG. 2 is an example of a fuel cell stack, in accordance with certain examples.

In accordance with certain other examples, the fuel cell assemblies disclosed here are typically constructed and arranged to include a fuel cell stack. Without wishing to be bound by any particular scientific theory, a fuel cell stack includes a plurality of fuel cells suitably configured to output a voltage from the fuel cell stack. The fuel cell stack can include one or more end-plates or separator plates that are constructed and arranged to receive the voltage produced by the individual fuel cells of the fuel cell stack and can also serve to supply gas to the fuel cells of the fuel cell stack. An exemplary fuel cell stack is shown in FIG. 2. Fuel cell stack 200 includes first fuel cell 205, second fuel cell 210 and third fuel cell 215. The exact number of fuel cells in a fuel cell stack can vary depending on the desired voltage output. In certain applications, there are between about 2 and about 70 fuel cells in a fuel cell stack, more particularly about 20 to about 70 fuel cells in a fuel cell stack, e.g., about 40 to about 60 fuel cells in a fuel cell stack. It will be within the ability of the person of ordinary skill in the art, given the benefit of this disclosure, to select or design suitable fuel cell stacks for use in the fuel cell assemblies disclosed herein.

Figure 3:
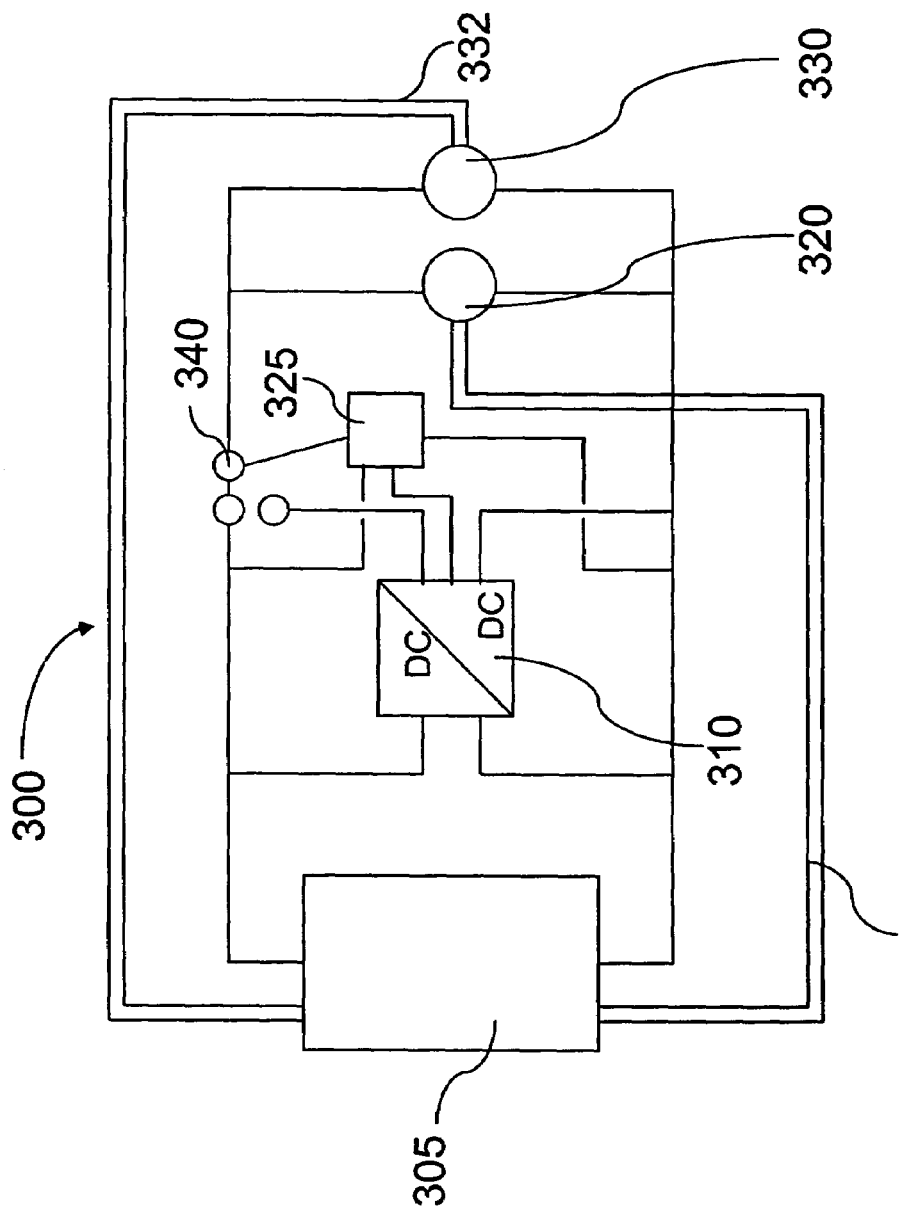
FIG. 3 is an example of a self-starting fuel cell assembly configured for operation in a start-up stage, in accordance with certain examples.
Figure 4:
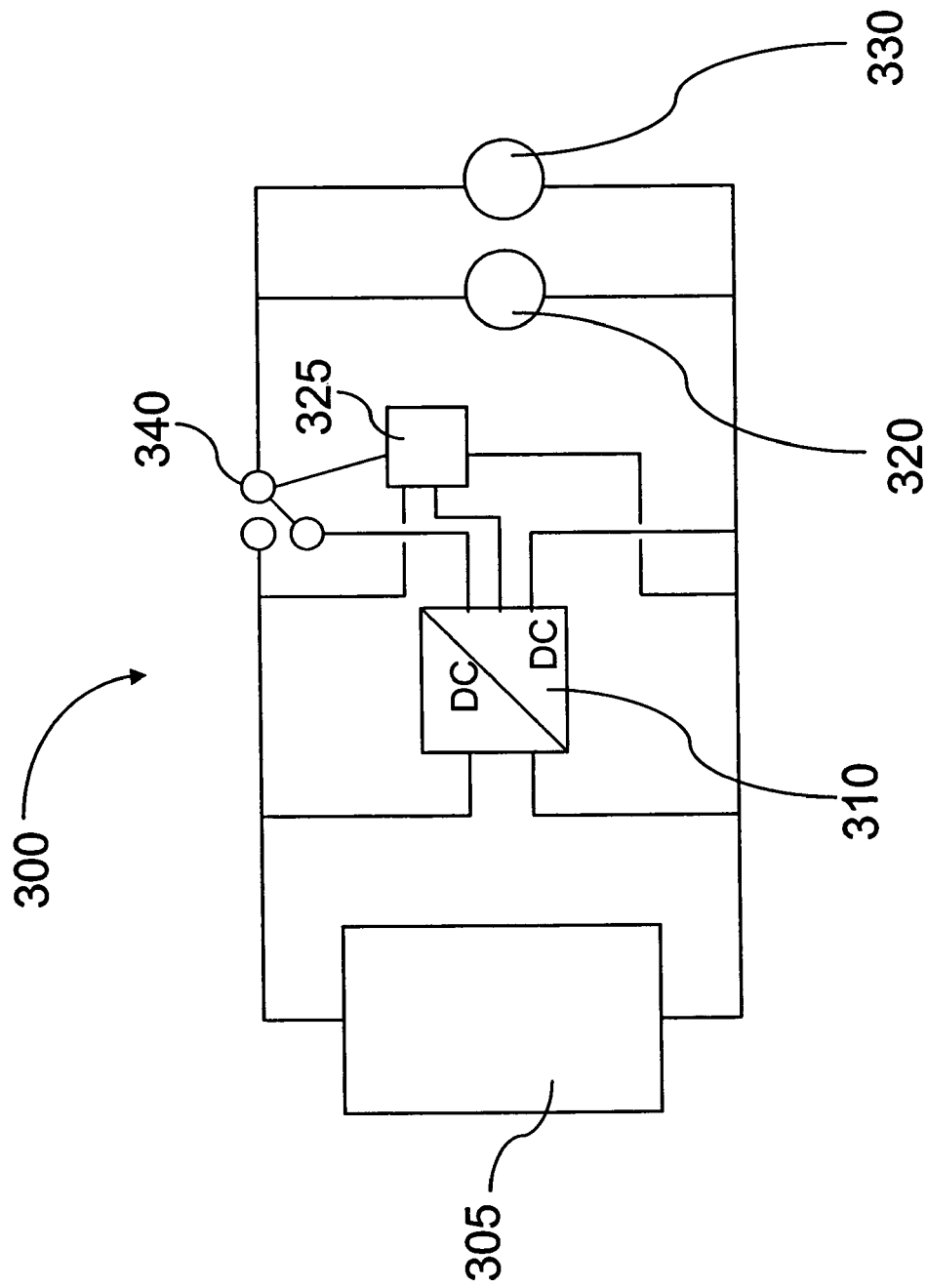
FIG. 4 is the self-starting fuel cell assembly of FIG. 3 configured for operation in a working stage, in accordance with certain examples.

In accordance with certain examples, a fuel cell assembly is shown in FIG. 3. Fuel cell assembly 300 includes fuel cell stack 305 in electrical communication with DC/DC converter 310. Fuel cell assembly 300 also includes air source and corresponding pump (collectively 320) in fluid communication with fuel cell stack 305 through fluid line 322. As used here, the term "fluid" is used in the broad sense and encompasses gases, liquids, supercritical fluids and the like that may be sent from the fuel source or the air source to the fuel cell assembly. Control circuit 325 is used to control DC/DC converter 310 and the position of switch 340. Fuel cell assembly 300 also includes fuel source and corresponding pump (collectively 330) in fluid communication with fuel cell stack 305 through fluid line 332. Each of the air source and the fuel source are also in electrical communication with fuel cell stack 305. Fuel cell assembly 300 further includes first switch 340 that is configured to be in a first position during a start-up stage and is configured to be in a second position during a working stage. When first switch 340 is in the first position as shown in FIG. 3, voltage generated by fuel cell stack 305 is directed to air source 320 and fuel source 330 directly from the terminals of fuel cell stack 305 and DC/DC converter 310 is disconnected from air source 320 and fuel source 330. This first position of switch 340 allows air source 320 and fuel source 330 to use the supplied voltage to supply additional air and fuel, respectively, to the fuel cell stack. This process allows fuel cell stack 305 to generate additional voltage. Without wishing to be bound by any particular scientific theory, the result of this configuration is a positive feedback loop. While positive feedback loops are usually undesirable because they are considered unstable and provide no control over the air source and fuel source, in the start-up stage of the fuel cell assembly, a positive feedback loop can be exploited to pull the fuel cell assembly quickly up to the working stage. Once the fuel cell assembly voltage reaches a pre-defined or threshold voltage, first switch 340 is switched to a second position (see FIG. 4) such that voltage from the fuel cell stack is routed through DC/DC converter 310 to provide a negative feedback loop to control air source 320 and fuel source 330. Routing of the voltage through DC/DC converter 310 provides control over the air source and the fuel source. The negative feedback loop also provides a more stable system for generation of power that can be used to power one or more devices, for example. Air source 320 and fuel source 330 each typically includes a motorized pump or pumping device to control the amount of air or fuel that is supplied to the fuel cell stack. Such pumping devices are typically in electrical communication with DC/DC converter 310. In the system of FIG. 4, both air source 320 and fuel source 330 receive common DC voltage from DC/DC converter 310. In other examples or embodiments, the air source and the fuel source may be separately controlled with each receiving its own controlled voltage. Suitable motorized pumps and pumping devices will be readily selected by the person of ordinary skill in the art, given the benefit of this disclosure.

Figure 5C:
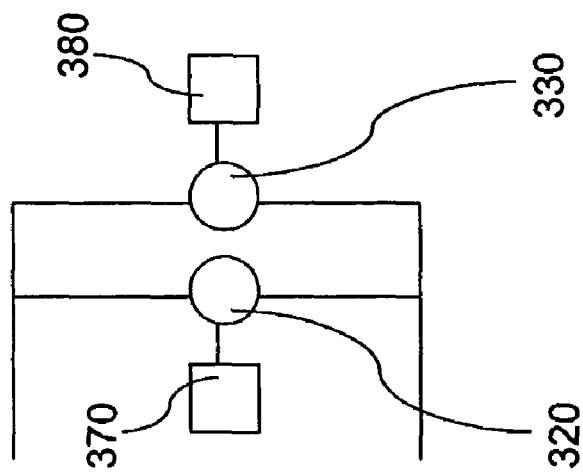
FIGS. 5A-5C are examples showing illustrative configurations of starting devices, in accordance with certain examples.
Figure 5B:
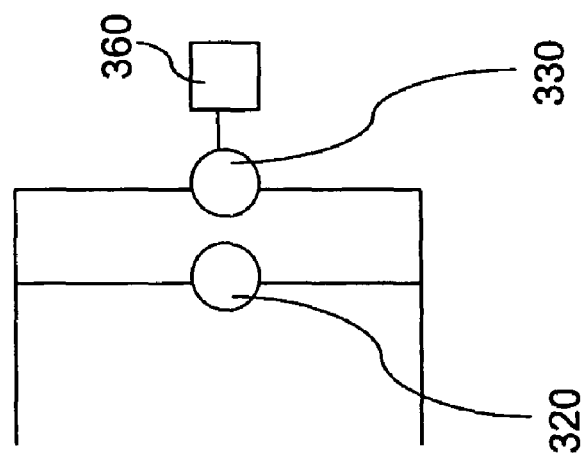
Figure 5A:
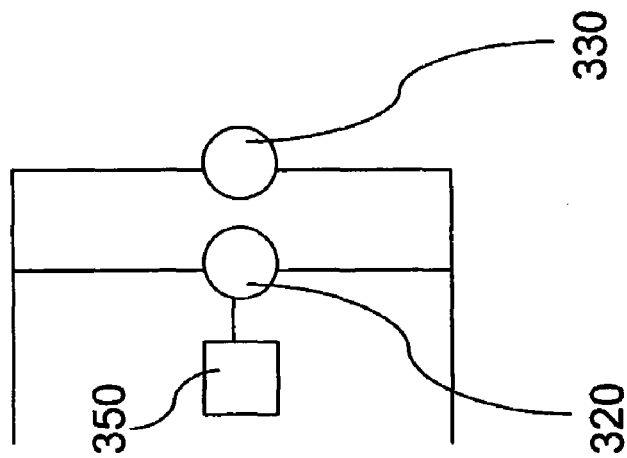

In accordance with certain examples and referring to FIG. 5A, starting device 350 is shown in communication with air source 320. The exact configuration of starting device 350 may vary depending on the type of starting device used. For example, where starting device 350 is a tube configured to receive an operator's exhalation, starting device 350 is in fluid communication with air source 320. Where starting device 350 is a mechanical lever or a kick-starter, starting device 350 can be mechanically linked to air source 320, e.g., linked to a pump for the air source. Where starting device 350 is an external battery, starting device 350 is in electrical communication with air source 320. Additional configurations will be readily selected by the person of ordinary skill in the art, given the benefit of this disclosure. Referring to FIG. 5B, starting device 360 is in communication with fuel source 330. Similar to starting device 350 shown in FIG. 5A, starting device 360 may take numerous forms and the exact nature of the configuration or linkage between starting device 360 and fuel source 330 can vary depending on the selected starting device. It will be recognized by the person of ordinary skill in the art, given the benefit of this disclosure, that the air source or fuel source, or both, can include a starting device. That is, in certain examples, each of air source 320 and fuel source 330 includes a starting device, such as starting devices 370 and 380, respectively, shown in FIG. 5C. For ease of illustration and to provide a more user-friendly description of the illustrative examples discussed further below, a starting device in communication with an air source is shown.

Figure 6:
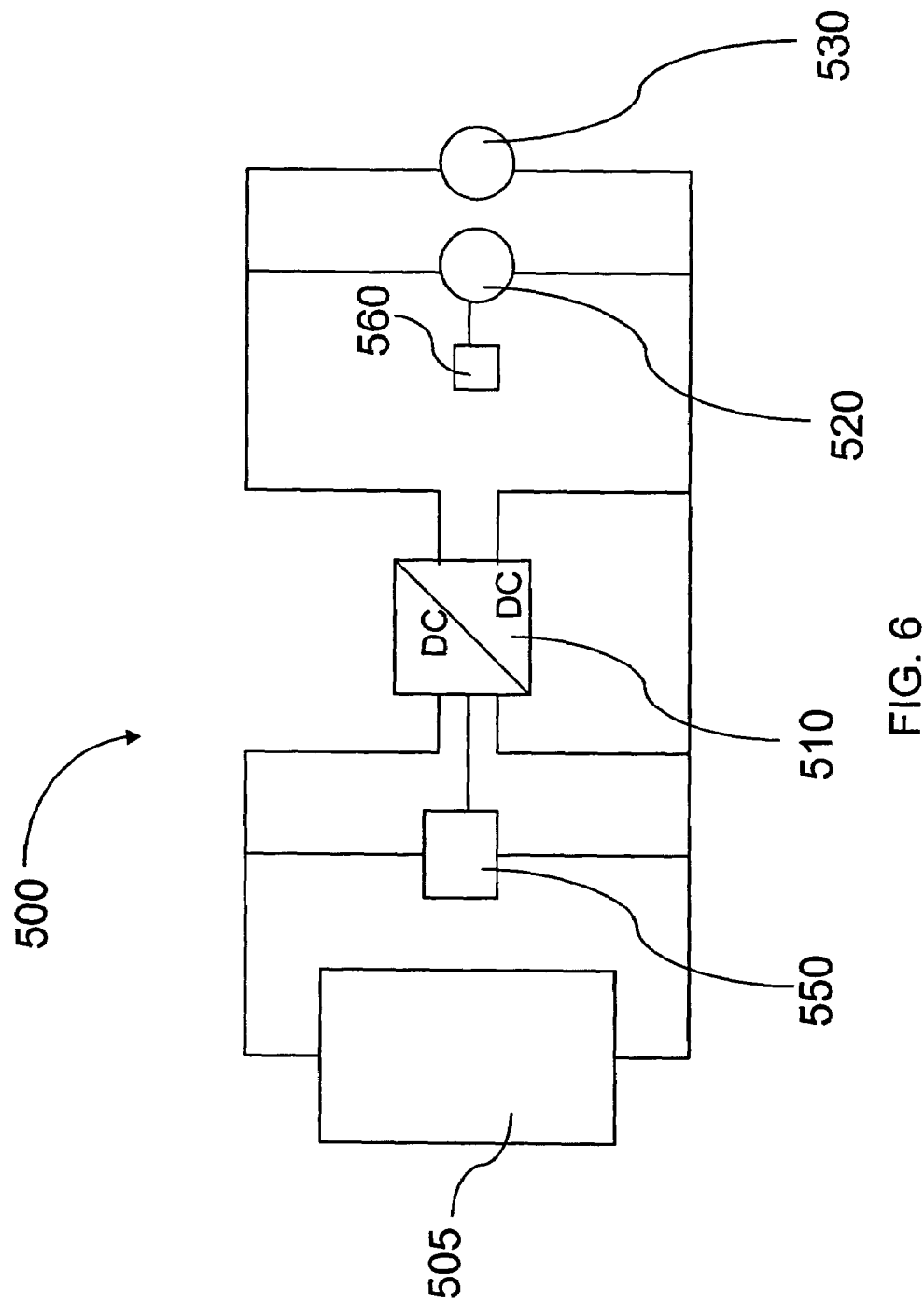
FIG. 6 is an example of a self-starting fuel cell assembly that includes a microprocessor, in accordance with certain examples.

In accordance with certain examples, another example of a fuel cell assembly is shown in FIG. 6. In this example, fuel cell assembly 500 includes fuel cell stack 505 in electrical communication with microprocessor 550, and DC/DC converter 510 in electrical communication with microprocessor 550, air source 520 and fuel source 530. Starting device 560 is in communication with air source 520, and each of air source 520 and 530 is in fluid communication with fuel cell stack 505. During the start-up stage of fuel cell assembly 505, starting device 560 is constructed and arranged to force air from the air source, or air already present in a fluid line in communication with the air source, into fuel cell stack 505. As fuel cell stack 505 generates voltage, microprocessor 550 controls DC/DC converter 510 such that the input voltage to DC/DC converter 510 is substantially the same as the output voltage from DC/DC converter 510 to create a positive feedback loop where substantially all voltage produced by fuel cell stack 505 is fed to air source 520 and fuel source 530. The voltage output by DC/DC converter 510 can be used by air source 520 and/or fuel source 530 to provide air and fuel, respectively, to fuel cell stack 505. The voltage generated by fuel cell stack 505 can be fed back to air source 520 and fuel source 530 such that additional air and fuel can be supplied to fuel cell stack 505, and fuel cell stack 505 can generate additional voltage. Once the voltage of fuel cell stack 505 reaches a pre-defined or threshold voltage, microprocessor 550 switches the fuel cell assembly from the start-up stage to the working stage by altering the voltage sent from DC/DC converter 510 to air source 520 and fuel source 530 to create a negative feedback loop to maintain the voltage of the fuel cell stack at the pre-defined or threshold voltage. It will be within the ability of the person of ordinary skill in the art, given the benefit of this disclosure, to design fuel cell assemblies that include one or more microprocessors configured to control the fuel cell assembly during the start-up stage and the working stage. Exemplary microprocessors include, but are not limited to, Motorola PICC 18, Siemens C166, Hitachi H8, Texas TMS 2812, Atmel ATMega 8535, and digital signal processors can also be used. Air source 520 and fuel source 530 each typically includes a motorized pump or pumping device to control the amount of air or fuel that is supplied to the fuel cell stack. Suitable motorized pumps and pumping devices will be readily selected by the person of ordinary skill in the art, given the benefit of this disclosure, and exemplary pumps includes, but are not limited to, fans, blowers, compressors, reciprocating pumps, such as those commercially available from Thomas/Rietschle (Louisville, Ky.), Ametek Rotron (Kent, Ohio), Sanyo Denki (Japan), and KNF (Germany). In the system of FIG. 5, both air source 520 and fuel source 530 receive common DC voltage from DC/DC converter 510. In other examples or embodiments, the air source and the fuel source may be separately controlled with each receiving its own controlled voltage.

Figure 7:
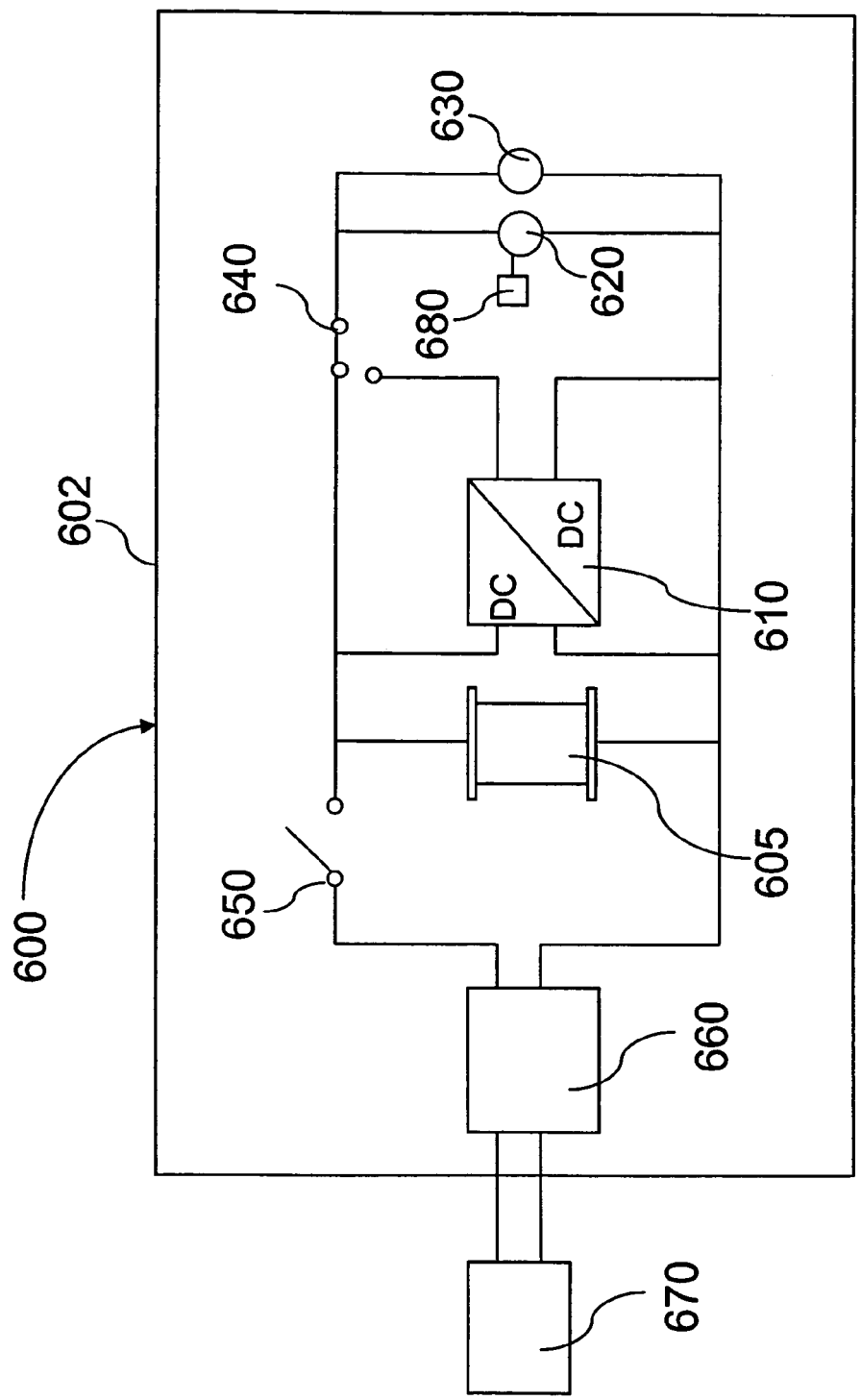
FIG. 7 is another example of a self-starting fuel cell assembly configured for operation in a start-up stage, in accordance with certain examples.
Figure 8:
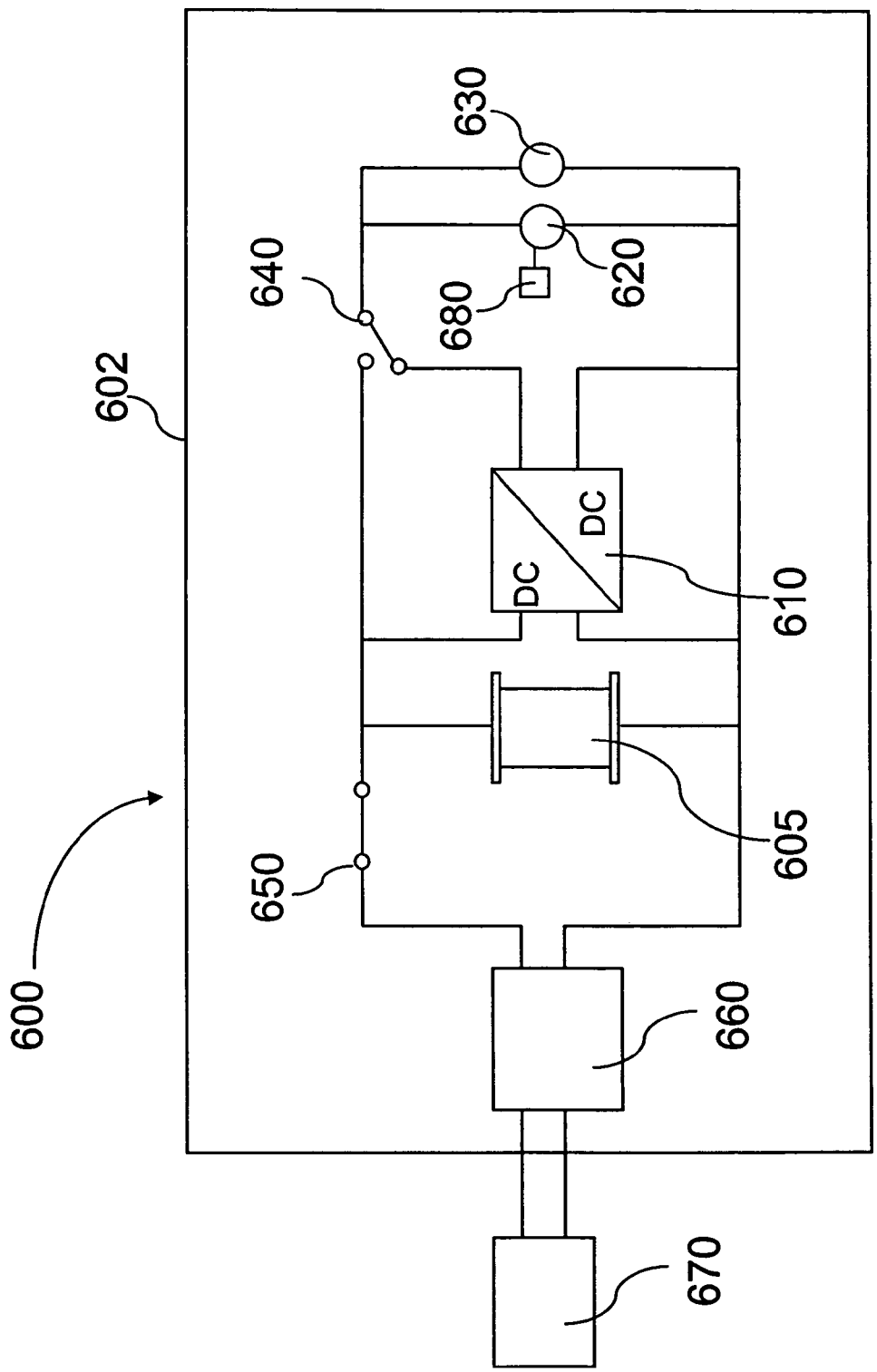
FIG. 8 shows the self-starting fuel cell assembly of FIG. 7 configured for operation in a working stage, in accordance with certain examples.

In accordance with an additional example, a fuel cell assembly is shown in FIG. 7. Fuel cell assembly 600 includes a housing 602, fuel cell stack 605, DC/DC converter 610 in electrical communication with fuel cell stack 605, air source and pump (collectively 620) and fuel source and pump (collectively 630) each of which is in fluid communication with fuel cell stack 605. Fuel cell assembly 600 may also include a control circuit (not shown) to control DC-DC converter 610 and the position of switch 640 and switch 650. Fuel cell assembly 600 also includes switch 640 that is configured to be in a first position during the start-up stage (as shown in FIG. 7) and a second position during the working stage (as shown in FIG. 8). Fuel cell assembly further includes a load converter 660 to provide power to device 670 during the working stage of the fuel cell assembly. In certain examples, load converter 660 is a DC/DC converter, an DC/DC converter or other suitable device for outputting a suitable voltage for use by device 670. Referring to FIG. 7, during the start-up stage of fuel cell assembly 600, switch 640 is connected such that air source and pump 620 and fuel source and pump 630 are in electrical communication with the terminals of fuel cell stack 605. Starting device 680 is configured to provide an initial stimulus to kick-off or start the fuel cell stack to produce a voltage. Second switch 650 is disconnected such that no power is provided to device 670. If second switch 650 remains connected at all times, then device 670 will consume voltage generated by fuel cell stack 605. Opening second switch 650 permits any voltage generated by fuel cell stack 605 to be used by air source and pump 620 and fuel source and pump 630, which in turn provide additional air and fuel to fuel cell stack 605. Referring now to FIG. 8, after the voltage of the fuel cell assembly reaches a pre-defined value, or after a certain period, switch 640 is switched from the first position to a second position (see switch 640 in FIG. 8) such that voltage is routed through DC/DC converter 610 and the direct connection between air source pump 620 and fuel source pump 630 and the fuel cell stack terminals is disconnected. In the system of FIG. 6, both air source and pump 620 and fuel source and pump 630 receive common DC voltage from DC/DC converter 610. In other examples or embodiments, the air source and the fuel source may be separately controlled with each receiving its own controlled voltage. This configuration creates a negative feedback loop, which provides a more stable system than that which exists when positive feedback is used. Second switch 650 is closed so that the voltage generated by fuel cell stack 605 can be routed to load converter 660 to power device 670.

In accordance with certain examples, a fuel cell assembly is provided. The fuel cell assembly includes a fuel cell stack comprising a plurality of fuel cells, a starting device configured to provide an initial stimulus to the fuel cell stack for generating a voltage, and a device configured to feed voltage directly to at least one of an air source and a fuel source in a start-up stage and configured to feed voltage to a control system in a working stage. In certain examples, the device includes one or more relays, circuits, switches, etc. In other examples, the device includes a microprocessor, a load converter, such as, for example, an DC/AC converter or a DC/DC converter, and other suitable devices that can provide positive feedback control in certain configurations and negative feedback control in other configurations over the air source and/or the fuel source. In some examples, the starting device is a tube that is configured to receive an air input, e.g. air supplied by exhalation of a person into the tube. In other examples, the starting device is a mechanical cord, a kick-starter, a rope or chain that is pulled, a handle or wheel that it turned or cranked, a push button configured to force air and/or fuel into the fuel cell stack and other suitable devices that can be configured to provide an initial input stimulus to supply air or fuel to the fuel cell stack. In some examples a battery can act as the starting device.

In accordance with certain examples, a method of starting a fuel cell is provided. The method includes providing a stimulus that is operative to force air from an air source, or fuel from a fuel source, to a fuel cell stack. The stimulus is typically provided using any one or more of the starting devices discussed herein and other such starting device that will be selected by the person of ordinary skill in the art, given the benefit of this disclosure. Forcing air, or fuel, into the fuel cell stack allows the fuel cell stack to generate voltage. The generated voltage can be fed back to the air source, or fuel source, to drive an air source pump, and/or a fuel source pump. As discussed above, in certain configurations, feeding the voltage from the fuel cell stack to the air source or fuel source results in a positive feedback loop. This cycle can be repeated indefinitely, for a fixed period or until the voltage output by the fuel cell stack reaches a pre-defined or threshold voltage, for example, about 15 Volts to about 30 Volts, and more particularly about 15-18 Volts or about 26-30 Volts. Once the generated voltage reaches the pre-defined or threshold voltage, control of the air source and/or the fuel source can be switched by feeding or directing voltage generated by the fuel cell stack to a control system. In certain examples, the control system is configured such that a negative feedback loop is used to control the air source and/or the fuel source. The voltage can also be directed to a load converter for outputting a suitable voltage for use in powering a device.

Certain specific examples are described below to illustrate further certain of the innumerable embodiments and applications of the fuel cell assemblies disclosed here.

EXAMPLE 1

Direct Methanol Fuel Cell Assembly

Figure 9:
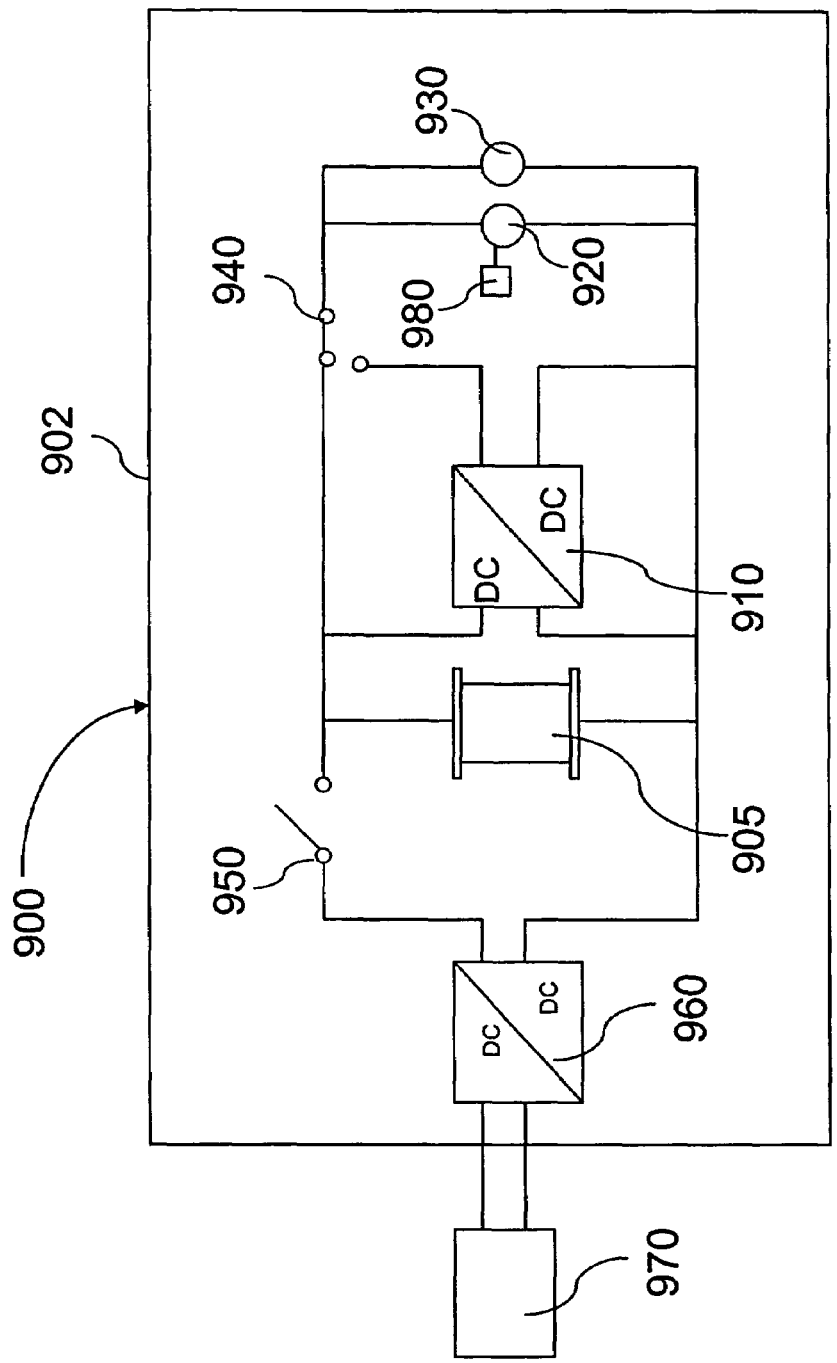
FIG. 9 is yet another example of a self-starting fuel cell assembly in a start-up stage where the starting device is a hollow tube, in accordance with certain examples.

A direct methanol fuel cell assembly 900 comprising a housing 902, a direct methanol fuel cell stack 905, a fuel system 930, an air system 920 and a control system was assembled as shown in FIG. 9. Fuel system 930 included a fuel source, which is an aqueous methanol solution in this example, and a pump for supplying the methanol to the anode of fuel cell stack 905. Air system 920 included an air source, which in this case is ambient atmospheric air, and a pump for supplying the air to the cathode of fuel cell stack 905. The control system in this example included a first switch 940, a second switch 950 and a DC/DC converter 910. During the start-up stage of fuel cell assembly 900, starting device 980, which in this example was a hollow tube in fluid communication with an inlet manifold of air system 920, was blown into to force air into fuel cell stack 905. This initial stimulus caused fuel cell stack 905 to output a small amount of voltage.

Figure 10:
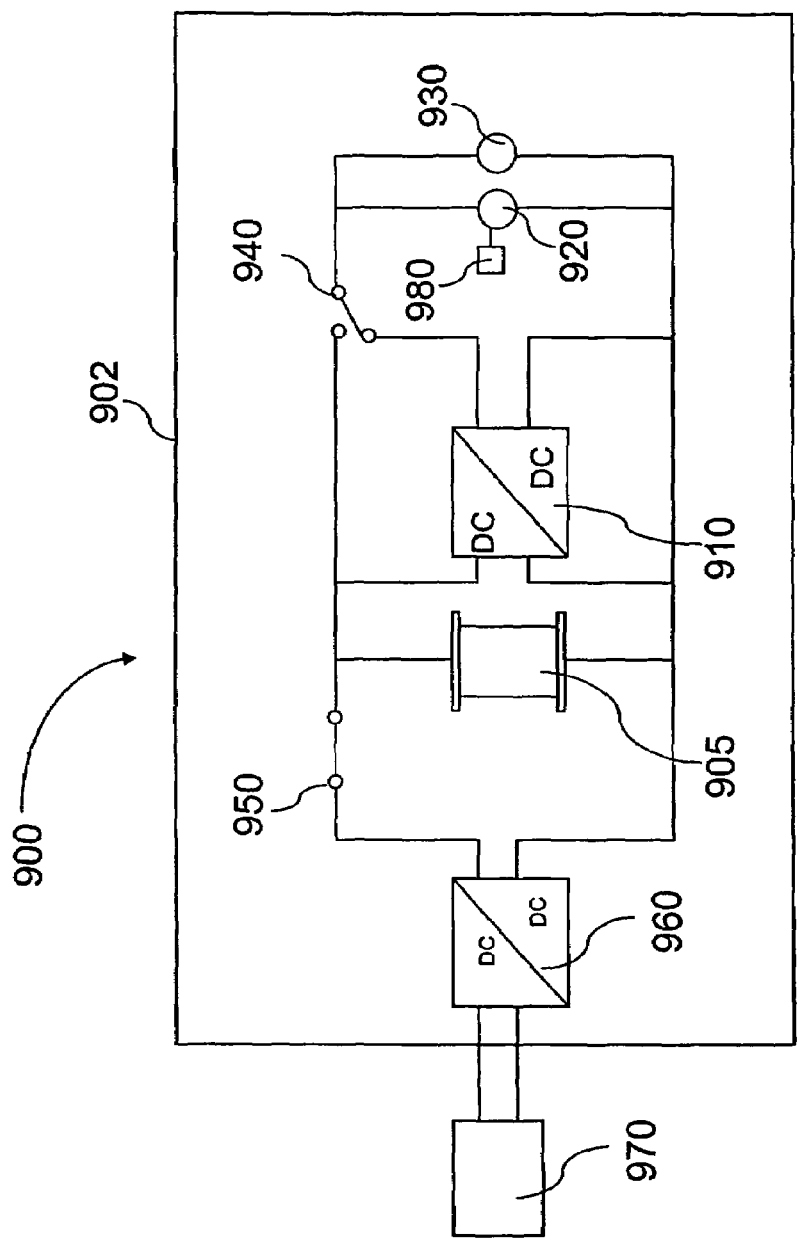
FIG. 10 shows the self-starting fuel cell assembly of FIG. 9 configured for operation in a working stage, in accordance with certain examples.

Also during the start-up stage, first switch 940 was closed such that voltage from the terminals of fuel cell stack 905 was supplied directly to fuel system 930 and air system 920. After the voltage output by fuel cell stack reached a threshold voltage of about 22 Volts, which took about 25 seconds, switch 940 was switched such that voltage from the fuel cell stack was supplied to DC/DC converter 960, which took over control of fuel system 930 and air system 920 (see FIG. 10). Switch 950 was also closed such that the voltage produced by the fuel cell stack can be outputted to power device 970, which in this example was a device requiring a 200W load. The fuel cell stack temperature used was 40° C.

Figure 11:
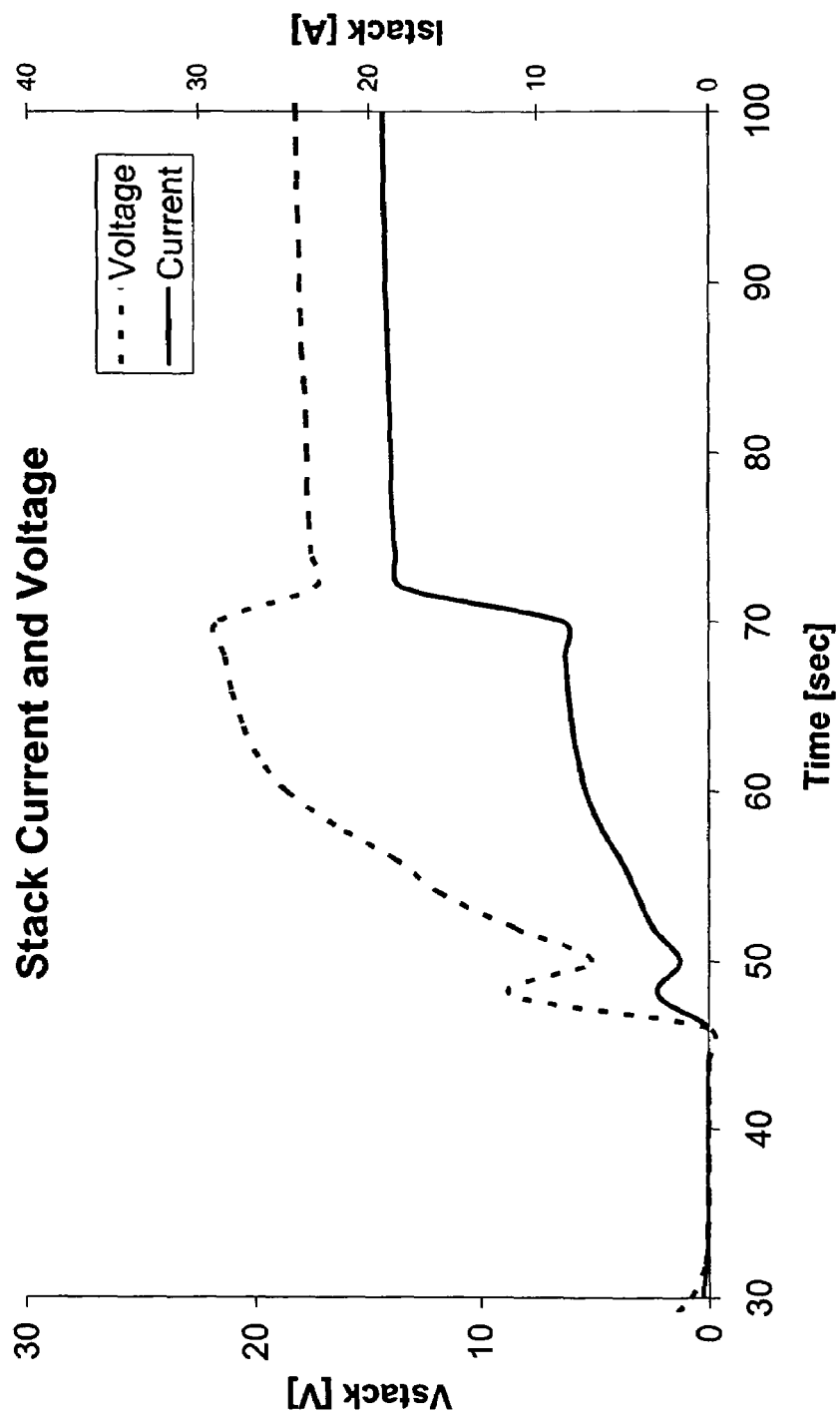
FIG. 11 is a graph of stack voltage and current versus time for the self-starting fuel cell assembly of FIGS. 9 and 10, in accordance with certain examples.

FIG. 11 shows a graph of stack current and voltage versus time for the fuel cell assembly described above in Example 1. The start-up stage of the fuel cell assembly was initiated at about 45 seconds. For about the next 24-25 seconds (until time=69 seconds), voltage produced by fuel cell stack was fed to the air system and the fuel system. At about 69 seconds, when the voltage reached a threshold voltage of about 22 Volts, the system was switched over so that the DC/DC converter sent voltage to the air system and the fuel system to control the air and fuel systems. Thereafter, the voltage output by the fuel cell assembly was substantially constant at about 19 Volts and the output current was also substantially constant at about 19 Amps.

Figure 12:
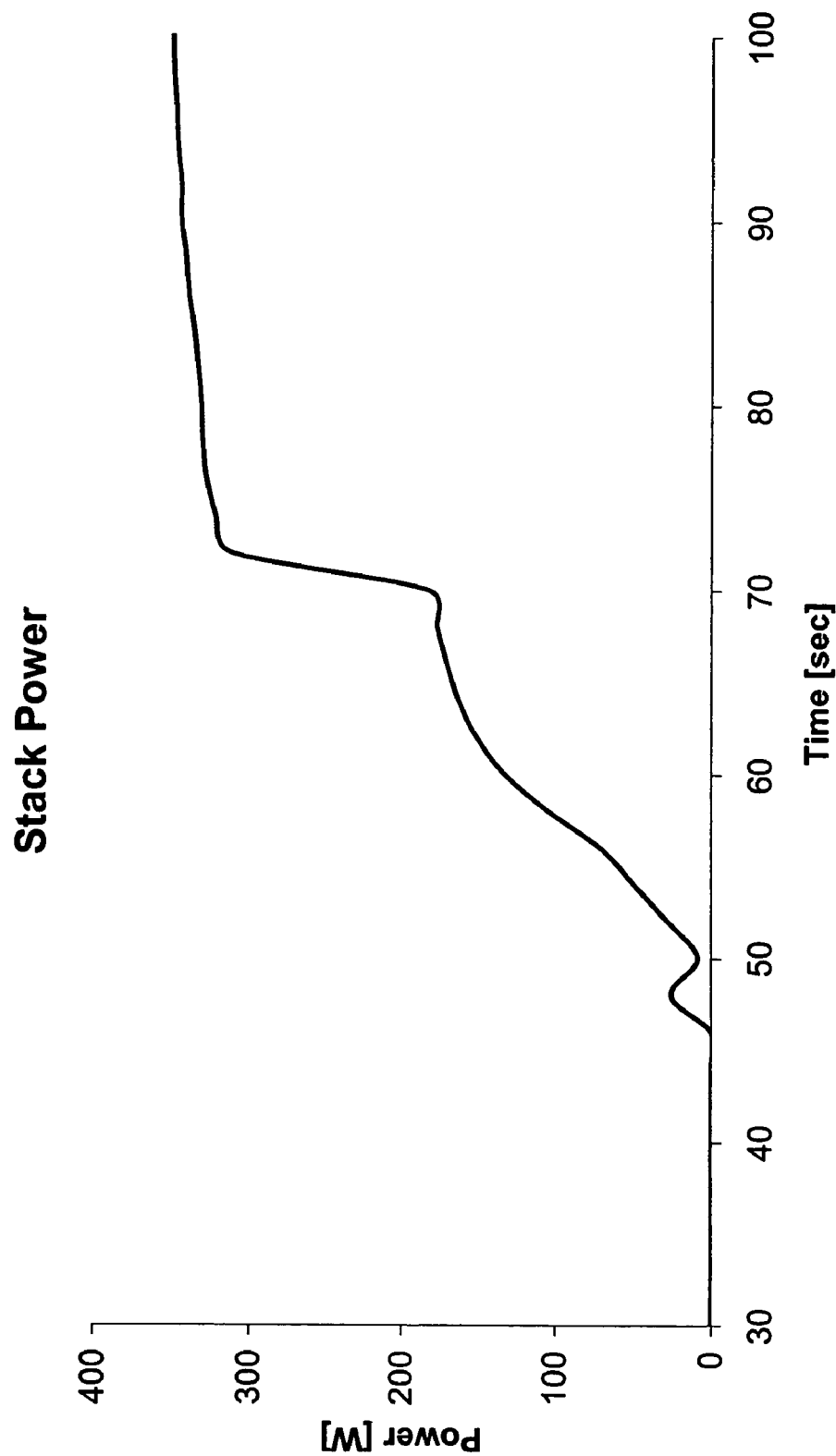
FIG. 12 is a graph of stack power versus time for the self-starting fuel cell assembly of FIGS. 9 and 10, in accordance with certain examples.

FIG. 12 shows a graph of stack power versus time for the fuel cell assembly described above in Example 1. Once the fuel cell assembly is switched over to a negative feedback loop (around 69 seconds) and a 200 W load is placed on the system, the stack power was substantially constant at about 320 W.

Figure 13:
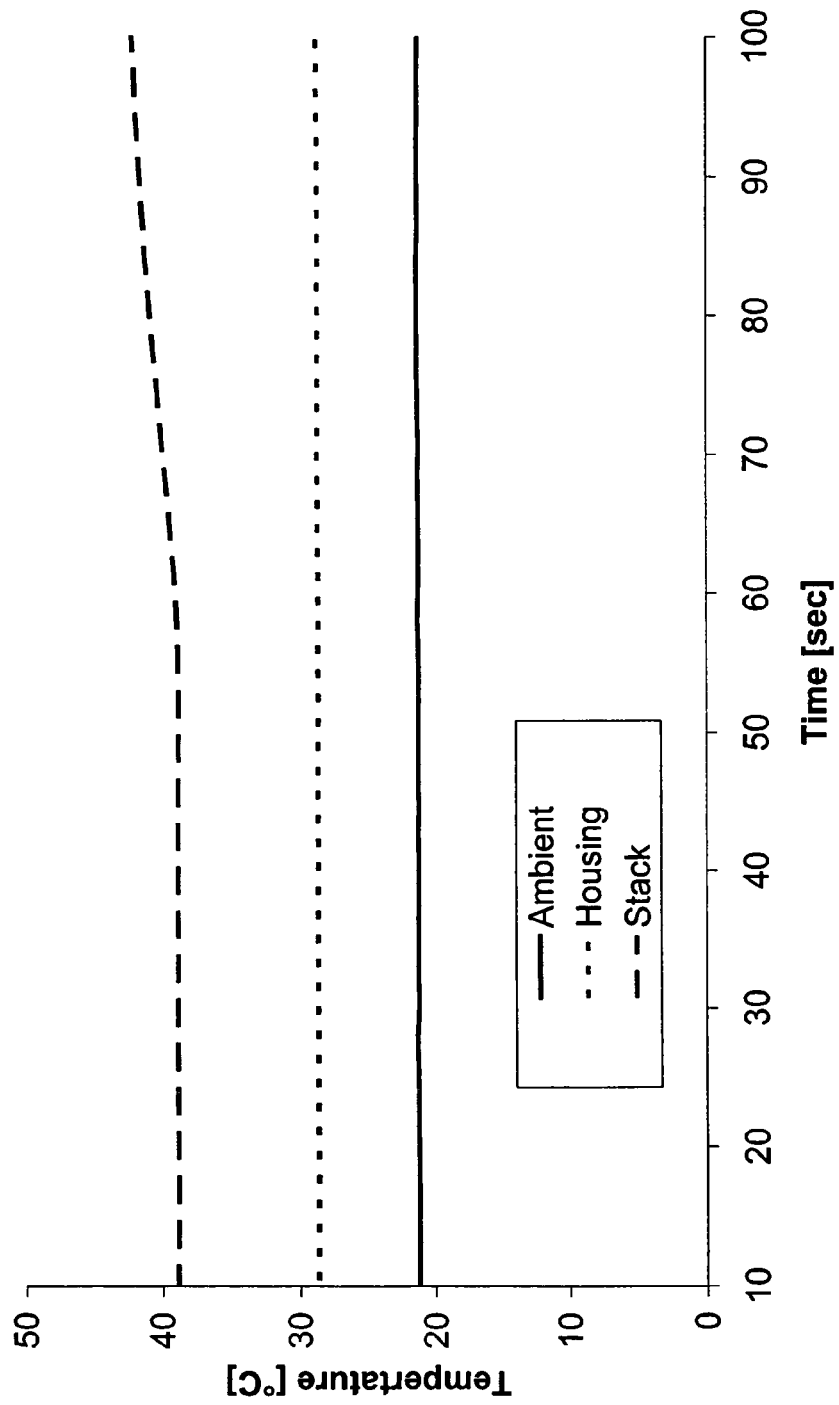
FIG. 13 is a graph of temperature versus time for the self-starting fuel cell assembly of FIGS. 9 and 10, in accordance with certain examples.

FIG. 13 shows a graph of temperature versus time for the ambient temperature, fuel cell stack temperature and fuel cell housing temperature. The stack temperature remained substantially constant around 40° C. The temperature of the housing stack remained substantially constant over time at a temperature of about 29° C., and the ambient temperature remained substantially constant at a temperature of about 22° C.

EXAMPLE 2

Fuel Cell Assembly with External Battery

Figure 14:
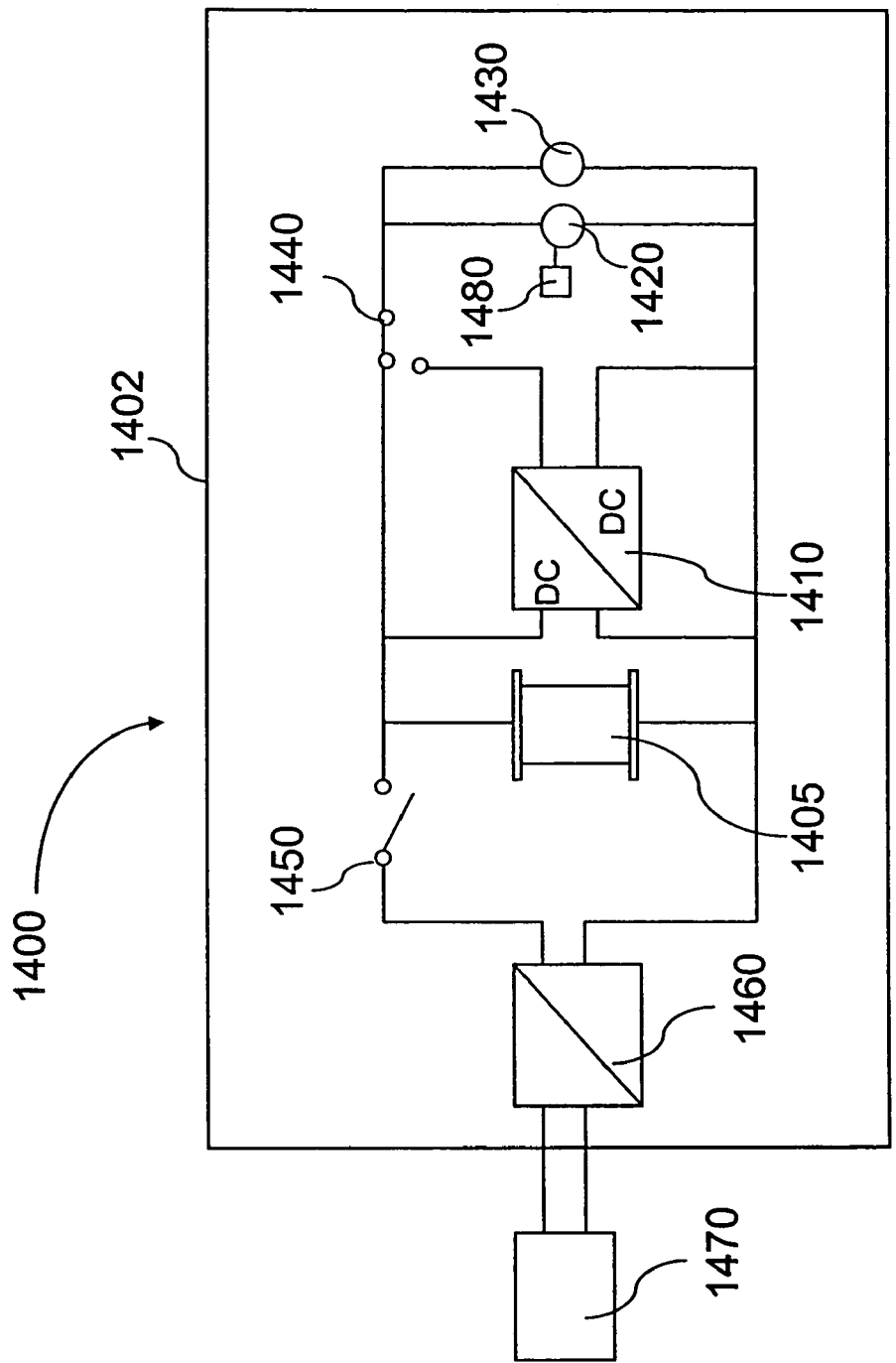
FIG. 14 is an example of a self-starting fuel cell assembly comprising a battery, in accordance with certain examples.

A fuel cell assembly where the starting device comprises an external battery is shown in FIG. 14. Fuel cell assembly 1400 comprises housing 1402, fuel cell stack 1405, DC/DC converter 1410, air source system 1420, fuel source system 1430, first switch 1440, second switch 1450, load converter 1460 and starting device 1480. In this example, starting device 1480 is a small battery, e.g. a 12 V battery. The starting device can be configured such that voltage output of the fuel cell stack is monitored. Should the output voltage drop below a certain voltage, the external battery can be used to power the air source system or the fuel source system to provide an initial amount of air and fuel to the fuel cell stack. A positive feedback loop may then be used to control the air source system and the fuel source system during the start-up stage as shown in FIG. 14. Once the fuel cell stack voltage reaches a threshold voltage, first switch 1440 is connected to the DC/DC converter and second switch 1450 is closed to provide voltage to external device 1470.

EXAMPLE 3

Self-Starting Fuel Cell Assembly with Microprocessor

Figure 15:
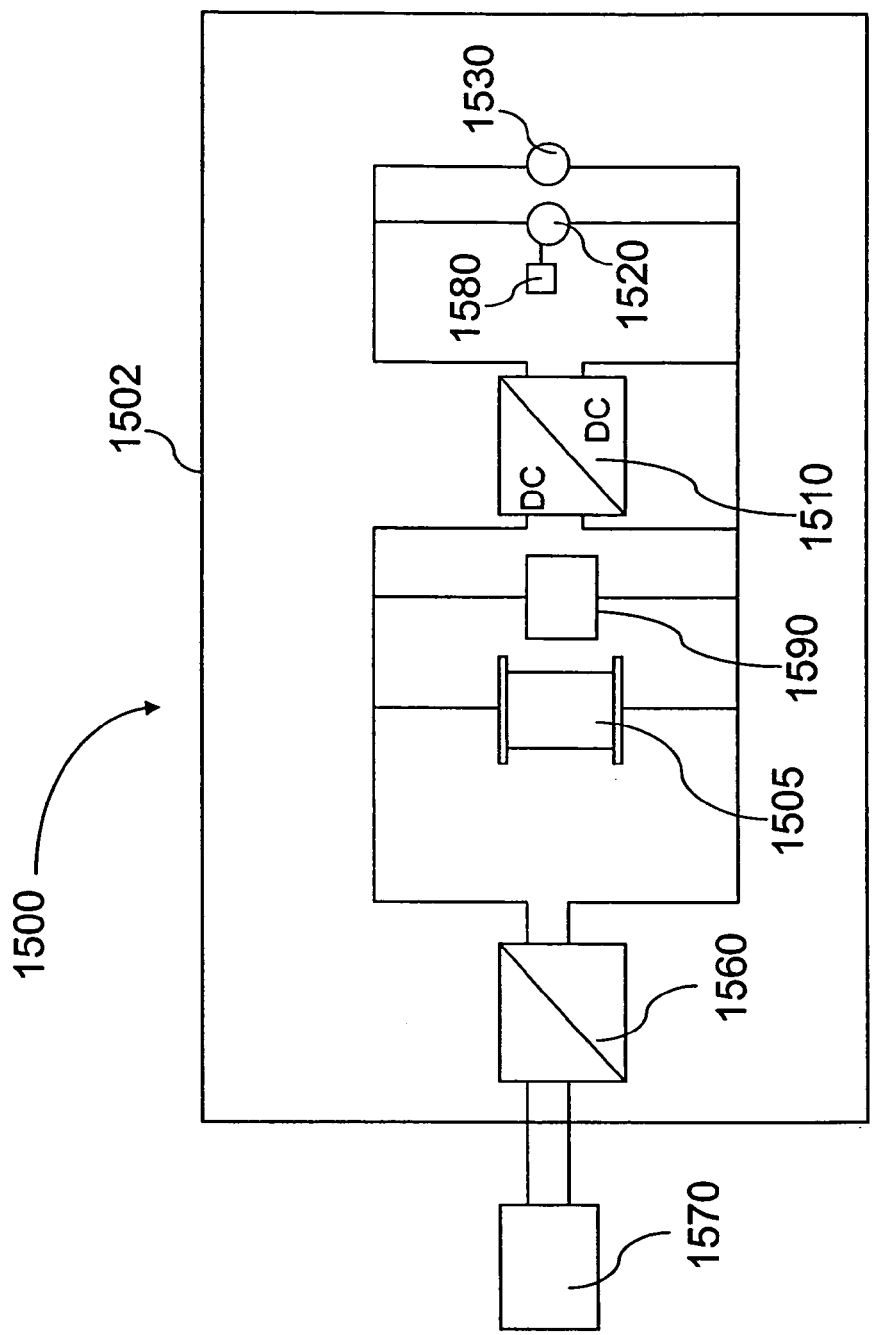
FIG. 15 is an example of a self-starting fuel cell assembly comprising a microprocessor, in accordance with certain examples.

Referring to FIG. 15, a microprocessor controlled fuel cell assembly is shown. Fuel cell assembly 1500 includes housing 1502, fuel cell stack 1505, DC/DC converter 1510, air source system 1520, fuel source system 1530, load converter 1560, starting device 1580, and microprocessor 1590. Starting device 1580 can be any of the starting devices discussed here, e.g. a hollow tube configured to be blown into, a kick-starter, a mechanical chain, a rope, a battery, etc., or other suitable devices that will be selected by the person of ordinary skill in the art, given the benefit of this disclosure. When starting up the fuel cell assembly of FIG. 15, starting device 1580 is used to generate an external stimulus sufficient to start microprocessor 1590. Microprocessor 1590 is initialized and generates a demand for full voltage for the air source system and the fuel source system. The microprocessor feeds the full generated voltage to the pumps of the air source system and the fuel source system so that the pumps operate in the voltage limit to create a positive feedback loop. Once the stack voltage reaches a pre-defined voltage, the reference voltage from the microprocessor to the air source and fuel source pumps is switched to normal operating mode to obtain a negative feedback system.

Although the self-starting fuel cell assemblies and methods of using them have been described above in terms of certain examples, various alterations, modifications, substitutions, additions and improvements will be readily apparent to the person of ordinary skill in the art, given the benefit of this disclosure. Such alterations, modifications, substitutions, additions and improvements are intended to be within the scope and spirit of the self-starting fuel cell assemblies disclosed here. It is also intended that the indefinite articles "a" and "an," as used above and in the appended claims, mean one or more of the articles which they modify, and that the terms "include," "including" and "having" are interchangeable with the open ended term "comprising."

What is claimed is:

1. A fuel cell assembly that is operative in a start-up stage and in a working stage, the assembly comprising:
    a fuel cell stack comprising a plurality of fuel cells, each of the fuel cells comprising an anode, a cathode, and an electrolyte between the anode and the cathode;
    a fuel source in fluid communication with the anode;
    an air source in fluid communication with the cathode;
    a starting device in fluid communication with the air source and configured to provide initial air to the fuel cell stack; and
    a control system configured to detect an output voltage of the fuel cell stack and configured to control at least one of the air source and the fuel source to control the output voltage in the working stage and in the start-up stage, wherein in the working stage the at least one of the air source and the fuel source is controlled based on the output voltage detected using a negative feedback loop, and wherein in the start-up stage, the at least one of the air source and the fuel source is operated independent of the output voltage detected using a positive feedback loop.

2. The fuel cell assembly of claim 1, in which the control system comprises a DC-DC converter and a switch, in which the output voltage is converted through the DC-DC converter in the working stage, and in the start-up stage the output voltage is applied to the at least one of the air source and the fuel source.

3. The fuel cell assembly of claim 1, in which each of the fuel source and the air source comprises a pump.

4. The fuel cell assembly of claim 1, in which the fuel source comprises methanol and the air source comprises ambient atmospheric air.

5. The fuel cell assembly of claim 1, in which the control system moves from the start-up stage to the working stage once predetermined voltage is reached.

6. The fuel cell assembly of claim 1, in which the fuel cell stack further comprises a separator plate.

7. The fuel cell assembly of claim 1, in which the control system comprises a timing circuit for switching between the start-up stage and the working stage.

8. The fuel cell assembly of claim 1, in which the control system comprises a microprocessor.

9. The fuel cell assembly of claim 8, in which the control system switches from the start-up stage to the working stage once fuel cell stack voltage reaches a threshold voltage.

10. The fuel cell assembly of claim 9, further comprising a DC-DC converter or a DC-AC converter for outputting voltage to a load in electrical communication with the DC-DC converter or the DC-AC converter.

11. The fuel cell assembly of claim 1, in which the starting device is a kick-starter, a mechanical lever, or a pull starter.

12. The fuel cell assembly of claim 1, in which the control system comprises a microprocessor and a DC-DC converter or a DC-AC converter in electrical communication with the microprocessor, the fuel source and the air source.

13. The fuel cell assembly of claim 1, in which the control system comprises a first switch configured to provide electrical communication between the fuel cell stack and at least one of the fuel source and the air source in the staff-up stage and configured to provide electrical communication between the fuel cell stack and the control system in the working stage.

14. The fuel cell assembly of claim 12, further comprising a second switch configured to disconnect a load from the fuel cell stack during the start-up stage and configured to provide electrical communication between the fuel cell stack and the load in the working stage.

15. A method of starting a fuel cell including a fuel cell stack, a first air source in fluid communication with the fuel cell stack, and a fuel source in fluid communication with the fuel cell stack, the method comprising:
    feeding voltage generated by the fuel cell stack to at least one of the first air source and the fuel source independent of a detected output voltage until the generated voltage reaches a threshold voltage;
    converting the generated voltage into a control voltage after the generated voltage has reached the threshold voltage; and
    feeding the control voltage to at least one of the first air source and the fuel source.

16. The method of claim 15, further comprising providing an initial amount of fuel to the fuel cell stack.

17. The method of claim 15, further comprising configuring a first switch to provide electrical communication between the fuel cell stack and at least one of the first air source and the fuel source.

18. The method of claim 17, further comprising configuring the first switch to provide electrical communication between the fuel cell stack and the control system.

19. The method of claim 18, further comprising configuring a second switch to provide electrical communication between a load and the fuel cell stack.

20. The method of claim 19, further comprising converting the generated voltage to an AC voltage and applying the AC voltage to a load.

21. A fuel cell assembly comprising:
a fuel cell stack comprising a plurality of fuel cells; and
a device configured to feed voltage generated by the fuel cell stack directly to at least one of a first air source and a fuel source independent of a detected output voltage in a start-up stage and configured to feed voltage generated by the fuel cell stack to a control system to control at least one of the first air source and the fuel source in a working stage.

22. The fuel cell assembly of claim 21, wherein the fuel cell assembly comprises only one air source.

23. The method of claim 15, wherein converting the generated voltage into a control voltage comprises converting the generated voltage into a control voltage through a negative feedback loop.

24. The method of claim 15, wherein the fuel cell comprises only one air source.

25. The method of claim 15, further comprising providing an initial amount of air to the fuel cell stack to generate a voltage.

26. The assembly of claim 21, further comprising a starting device configured to provide an initial stimulus to the fuel cell stack for generating a voltage.

27. A fuel cell assembly that is operative in a start-up stage and in a working stage, the assembly comprising:
a fuel cell stack comprising a plurality of fuel cells, each of the fuel cells comprising an anode, a cathode, and an electrolyte between the anode and the cathode;
an air source in fluid communication with the cathode; and
a control system configured to detect an output voltage of the fuel cell stack, and further configured to convert from the start-up stage to the working stage upon detecting a threshold voltage,
wherein the control system is configured to feed voltage generated by the fuel cell stack directly to the air source in the start-up stage using a positive feedback loop independent of a detected output voltage, and wherein the control system is configured to feed voltage generated by the fuel cell stack to the air source in the working stage using a negative feedback loop based on the detected output voltage.

* * * * *